US009931885B1

(12) United States Patent
Pierson

(10) Patent No.: US 9,931,885 B1
(45) Date of Patent: *Apr. 3, 2018

(54) PIPE FITTER SQUARE

(71) Applicant: Steven Wayne Pierson, Kingsport, TN (US)

(72) Inventor: Steven Wayne Pierson, Kingsport, TN (US)

( * ) Notice: Subject to any disclaimer, the term of this patent is extended or adjusted under 35 U.S.C. 154(b) by 421 days.

This patent is subject to a terminal disclaimer.

(21) Appl. No.: 14/597,763

(22) Filed: Jan. 15, 2015

Related U.S. Application Data

(63) Continuation of application No. 13/548,258, filed on Jul. 13, 2012, now Pat. No. 9,021,713.

(60) Provisional application No. 61/608,194, filed on Mar. 8, 2012, provisional application No. 61/617,088, filed on Mar. 29, 2012.

(51) Int. Cl.
*B43L 7/10* (2006.01)

(52) U.S. Cl.
CPC ...................... *B43L 7/10* (2013.01)

(58) Field of Classification Search
CPC ...... B43L 7/10; B43L 7/06; B43L 7/12; F16L 37/248; G01B 5/24
USPC .......................... 33/529, 460–464, 468, 469
See application file for complete search history.

(56) References Cited

U.S. PATENT DOCUMENTS

| 185,504 | A | 12/1876 | Devoe |
| 847,720 | A | 3/1907 | Barbo |
| 1,205,687 | A | 11/1916 | Verhey et al. |
| 1,622,158 | A | 3/1927 | Liberty |
| 3,991,474 | A | 11/1976 | Rath |
| 4,472,883 | A | 9/1984 | Ortega |
| 5,440,818 | A | 8/1995 | Mailhot |
| 9,021,713 | B1 * | 5/2015 | Pierson .................. G01B 3/563 33/462 |

* cited by examiner

*Primary Examiner* — Yaritza Guadalupe-McCall
(74) *Attorney, Agent, or Firm* — Luedeka Neely Group, P.C.

(57) ABSTRACT

A measuring tool for determining angles at two points of interest, including an elongate arm and two protractors, one protractor rotatably mounted at each end of the arm. Each protractor includes a flat for positioning the protractor against one of the two points of interest. The angle at each point of interest is the angular measurement between the arm and the two flats, respectively. The arm may include two attachment sections, one each of the two attachment sections rotatably connected to one each of the two protractors, respectively, and an L-shaped guide having three connection points for selectively receiving and retaining the two attachment sections in various configurations as desired.

8 Claims, 21 Drawing Sheets

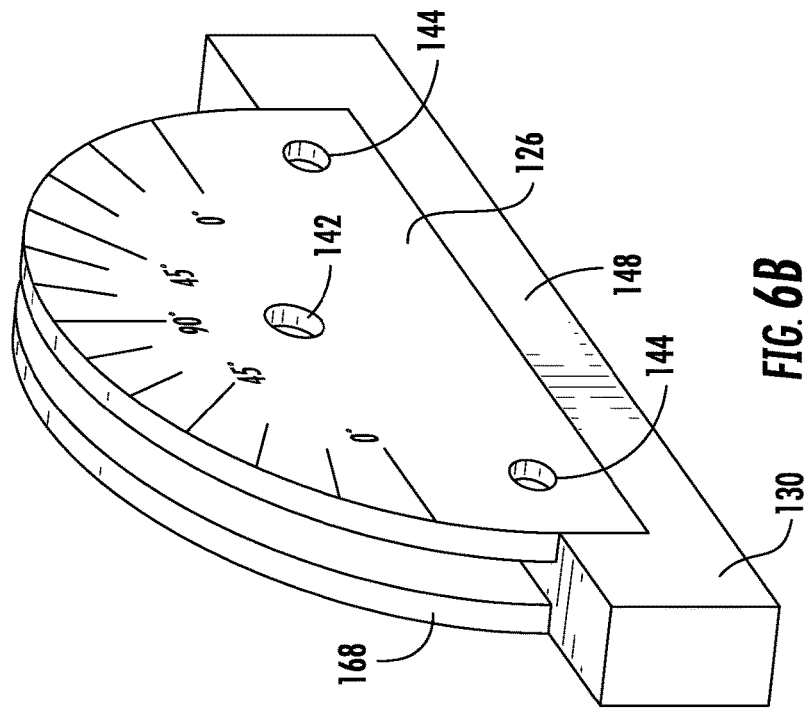
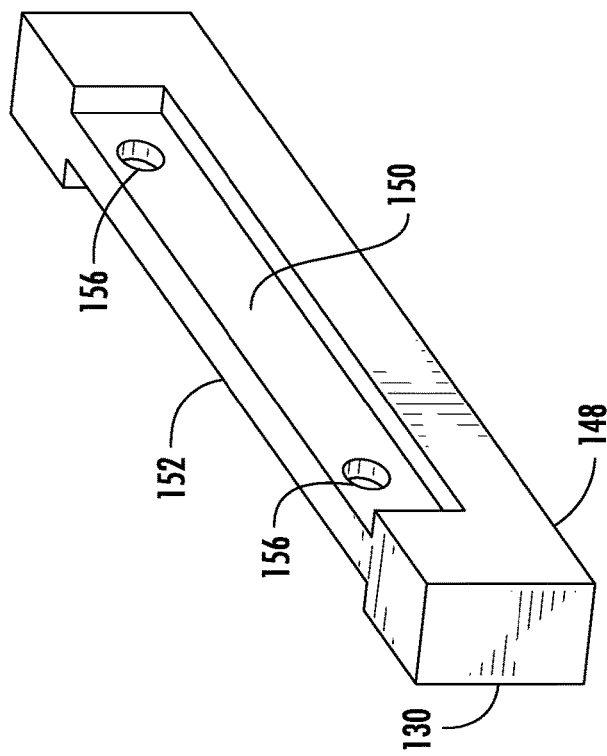
FIG. 6B
FIG. 6A

PIPE FITTER SQUARE

FIELD

This application is a continuation of U.S. non-provisional patent application Ser. No. 13/548,258, filed Jul. 13, 2012, entitled PIPE FITTER SQUARE, which claims priority to U.S. provisional patent application 61/608,194, filed Mar. 8, 2012, and U.S. provisional patent application 61/617,088, filed Mar. 29, 2012. This invention relates to the field of measuring hand tools. More particularly, this invention relates to a multi-functional squaring tool for use by pipe fitters.

BACKGROUND

In the field of pipe fitting, it is often necessary to align multiple pipes at various relative angles and also to align them at various angles relative to horizontal and vertical references. One important aspect of operating effectively in this field is to ensure that the pipe joints are aligned. Efficiency and timeliness are also important concerns. This requires a pipe fitter to be able to quickly, easily and accurately find the correct positions, offsets and angles of the various pipes. Typically, most pipes are aligned at either a 45° or a 90° with respect to one another. However, at other times, pipes may be aligned at angles other than 45° or a 90°, which requires the pipe fitter to use various angle finding tools or methods. However, these methods are often difficult or awkward and typically require the presence of two or more persons to support the tools and to position them in the correct location and configuration. Additionally, piping fitting often occurs in small, cramped areas, where space is very limited. Due to the lack of space, maneuverability and access to the pipe is often a concern. This problem is exacerbated when measuring and fitting a pipe requires two or more persons.

What is needed, therefore, is a tool that reduces problems such as those described above, at least in part.

SUMMARY

The above and other needs are met by a measuring tool for determining angles at two points of interest. The measuring tool includes an elongate arm having a first end and a second end, a first protractor rotatably mounted at the first end of the arm, and a second protractor rotatably mounted at the second end. Each protractor includes a first edge and a second edge. The first edge includes an arc and a first set of graduations for providing an angular measurement in degrees of incline between the protractor and the elongate arm. The second edge includes a flat for positioning the protractor against one of the two points of interest. The angle at each point of interest is the angular measurement between the arm and the two flats, respectively.

In some embodiments, the elongate arm may further include a reference marking for aligning with the first set of graduations. In certain other embodiments, the elongate arm includes an extension section, such that a distance along the elongate arm between the two protractors can be selectively extended and reduced.

In certain other embodiments, the elongate arm may further include two attachment sections, one each of the two attachment sections rotatably connected to one each of the two protractors, respectively, and an L-shaped guide having three connection points, one connection point on each of two ends of the L-shaped guide and one at an elbow position of the L-shaped guide. The connection points may be used for selectively receiving and retaining the two attachment sections in various configurations as desired.

In certain embodiments, each protractor may further include an arcuate slot and the arm may further include a post extending through the arcuate slot. The arcuate slot in combination with the post for guiding the rotation of the protractor with respect to the arm.

In some embodiments, the protractors may include two plates, one of each of the plates rotatably mounted on either side of the elongate arm. In other embodiments, the protractors may include two plates, one of each of the plates rotatably mounted on either side of the elongate arm, with the second edge fixedly mounted between the two plates. In certain other embodiments, the protractors may further include a lock for locking the protractor in a desired angular position with respect to the arm.

BRIEF DESCRIPTION OF THE DRAWINGS

Further advantages of the invention are apparent by reference to the detailed description when considered in conjunction with the figures, which are not to scale so as to more clearly show the details, wherein like reference numbers indicate like elements throughout the several views, and wherein:

FIG. 6A is perspective view of a contact member having a pair of ledges;

FIG. 6B is a perspective view of the contact member of FIG. 6A with a first plate and a second plate, respectively, positioned on the pair of ledges;

DETAILED DESCRIPTION

Figure 1:
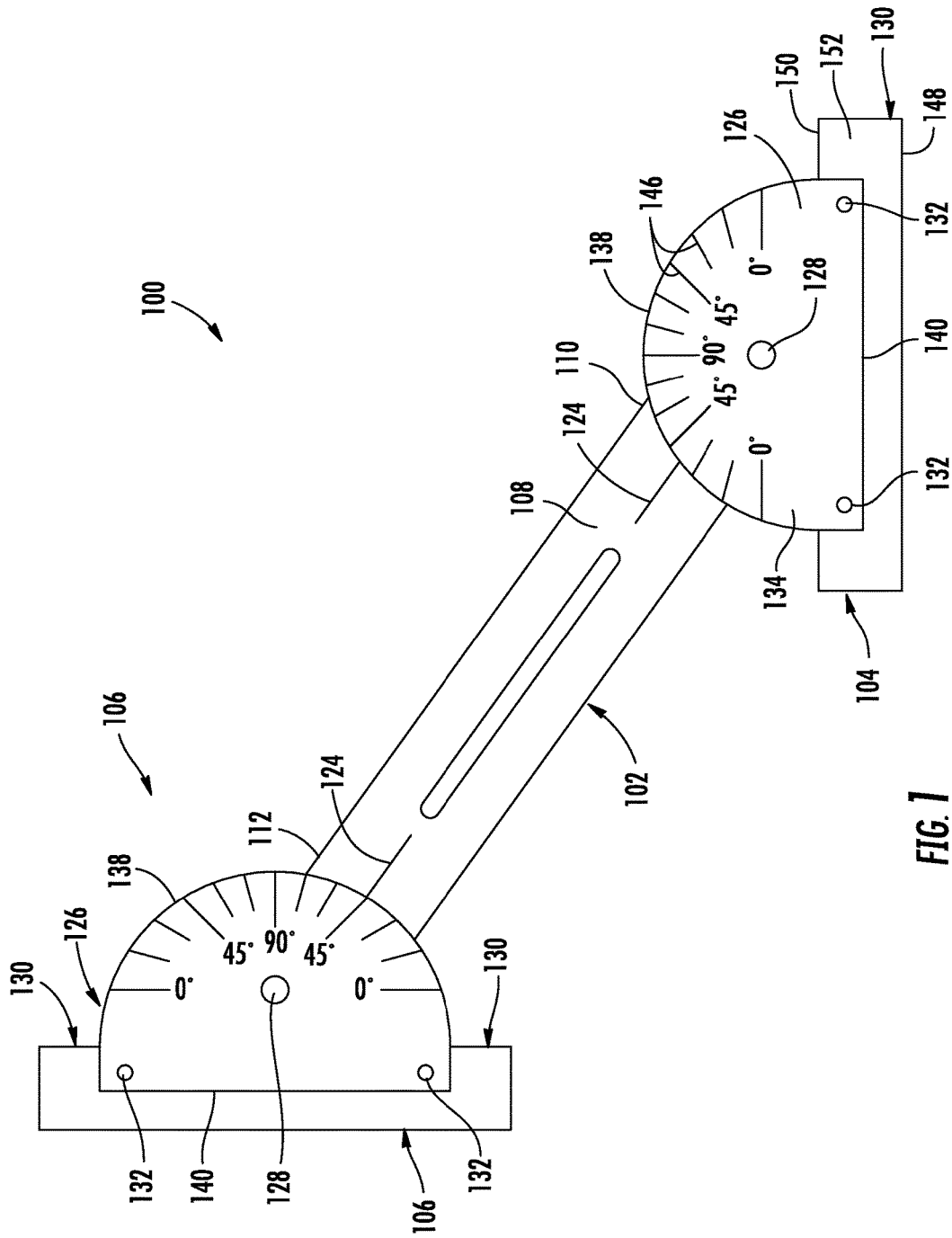
FIG. 1 is a front view of a first embodiment of a measuring device.

Referring now to FIG. 1, a measuring tool 100 is provided. Generally, the measuring tool 100 includes an elongate arm 102, a first protractor 104 and a second protractor 106. The components of the measuring tool 100 and the various embodiments and methods of use are described in detail herein.

Figure 2:
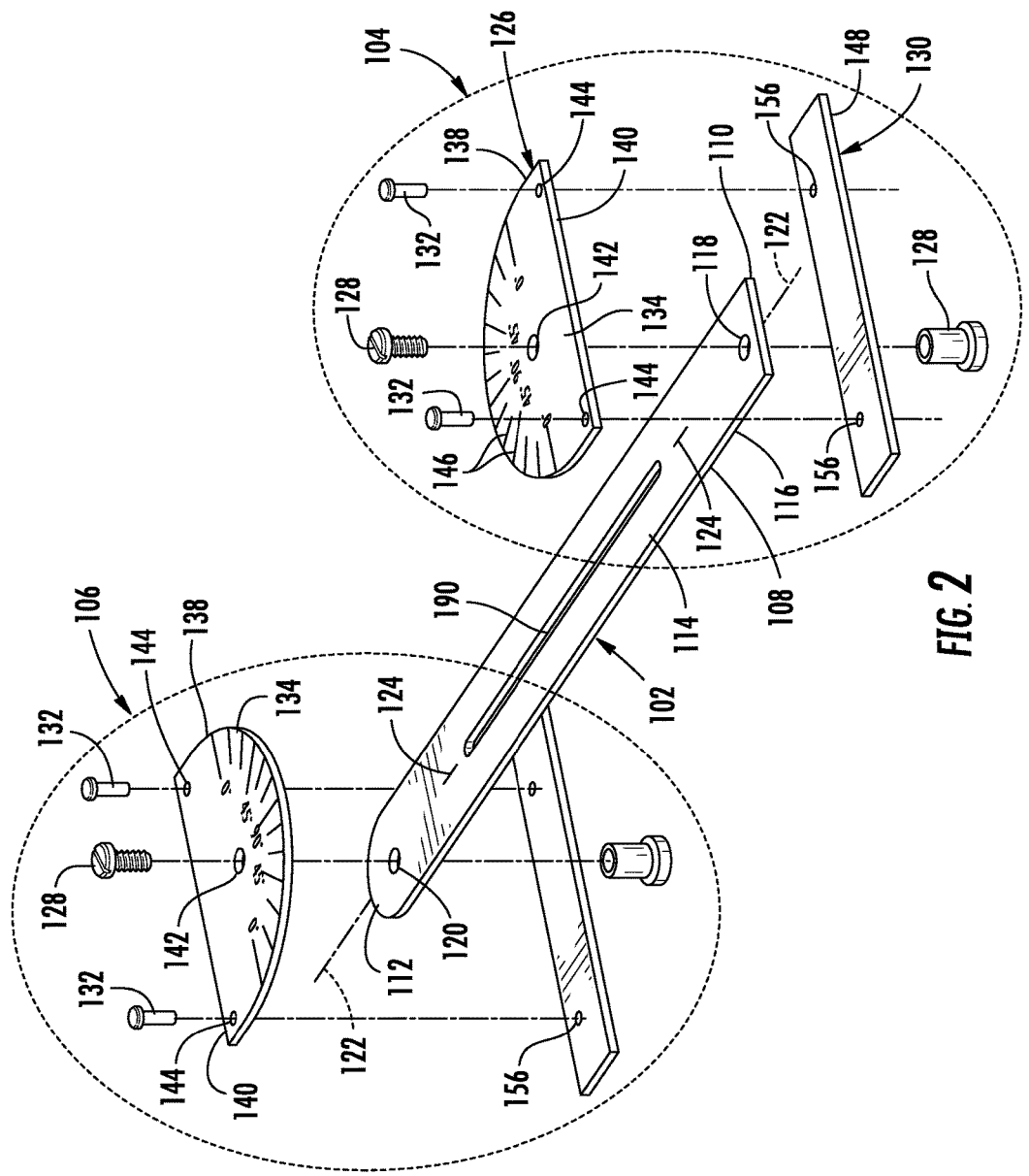
FIG. 2 is an exploded view of the measuring device depicted in FIG. 1.

As shown in FIG. 2, the arm 102 comprises a bar 108 having a first end 110, a second end 112, a first side 114, and a second side 116. A first connection opening 118 is located near the first end 110 and a second connection opening 120 is located near the second end 112, where both openings 118, 120 form a hole in the bar 108. The first protractor 104 is rotatably mounted at the first end 110 of the arm 102, and the second protractor 106 is rotatably mounted at the second end 112 of the arm 102. A central axis 122 of the bar 108 runs from the first end 110 to the second end 112. In some embodiments, as further explained below, the arm 102 may include an extension section such that a distance along the elongate arm 102 between the two protractors 104 and 106 can be selectively extended and reduced.

In some embodiments, at least one reference marking 124 is located on the first side 114 of the arm 102 and is positioned along at least a portion of the central axis 122. The reference marking 124 tends to assist the user in acquiring a measured angle quickly and easily when used in connection with either of the protractors 104, 106. At each point of interest, the angle may be measured by determining the angle between the arm 102 and each protractor 104 and 106, respectively.

Referring again to FIG. 1, while the following description refers to the first protractor 104 only, it should be understood that both of the protractors 104, 106 are, in some embodiments, formed with identical components and configurations, and may be used to obtain the angle between two points of interest. The first protractor 104 generally includes a first plate 126 and a connection member 128. In some embodiments, the protractor 104 may further include an elongate contact member 130 and a plurality of connectors 132.

The first plate 126 is two-sided and includes an outer face 134 that faces away from the arm 102 and an inner face (not shown) that faces towards the arm 102. The first plate 126 further comprises a first edge 138 that is generally arc-shaped and a second edge 140, which comprises a flat for positioning the protractor against one of the two points of interest. As shown in FIG. 2, a bore 142 is disposed at a central point of the first plate 126, such as at the center point of the arc formed by the first edge 138. Additionally, a plurality of connection apertures 144 is disposed proximate the second edge 140.

The first plate 126 may be secured to the bar 108 of the arm 102 via the connection member 128, which may include a threaded connection, a bolt, a pin, a rivet, or other similar connection means that allows the first plate 126 to rotate with respect to the bar 108. In certain other embodiments, the connection member 128 may be selectively tightened to prevent or arrest to a desired degree the rotational movement of the first protractor 104, including the first plate 126, with respect to the bar 108. This may include, for example, a screw connection or a clamping connection. To facilitate the rotation of the first plate 126 with respect to the arm 102, at least one of the ends 110, 112 of the bar 108 may be rounded. By rounding either or both ends 110, 112, sharp corners that may tend to prevent or limit the rotation are reduced.

Figure 3:
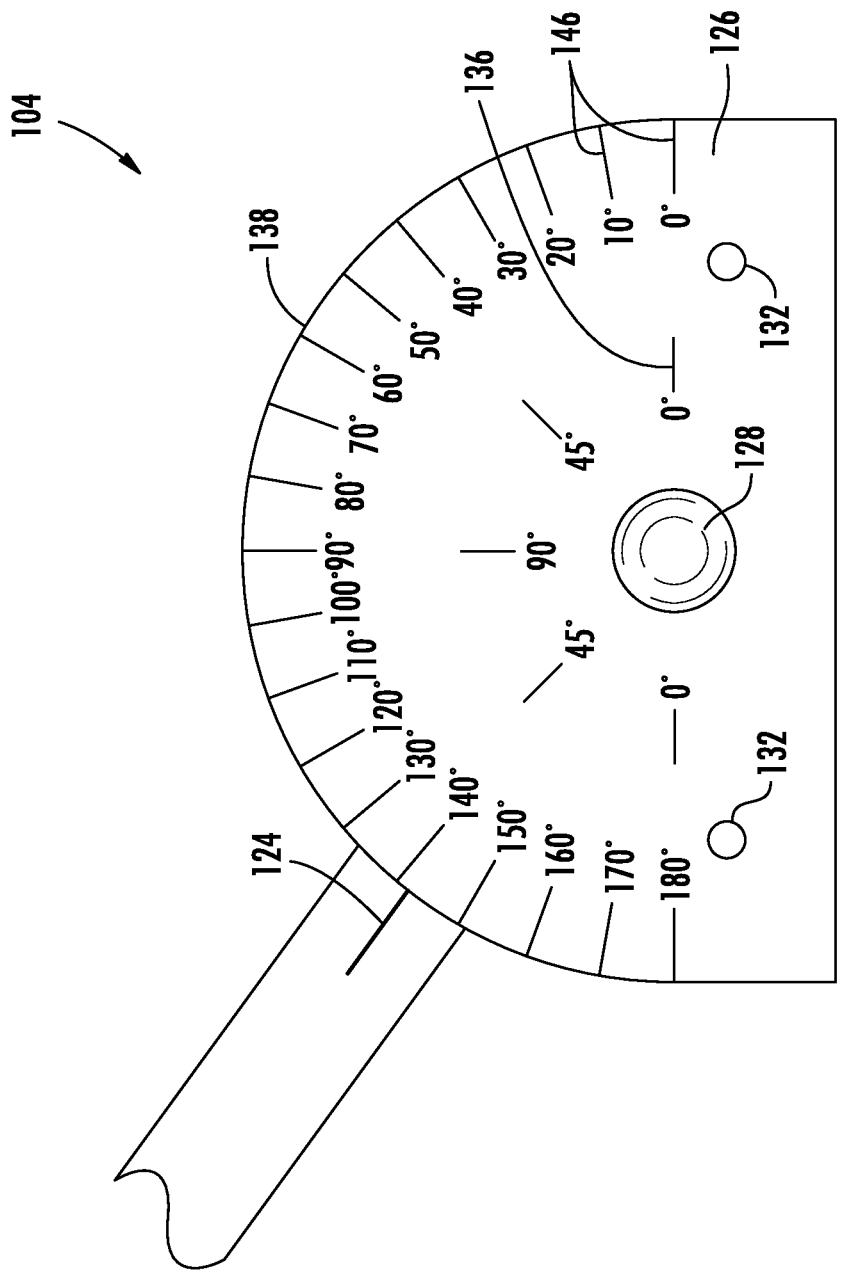
FIG. 3 is a front view of a protractor including graduation markings.
Figure 4:
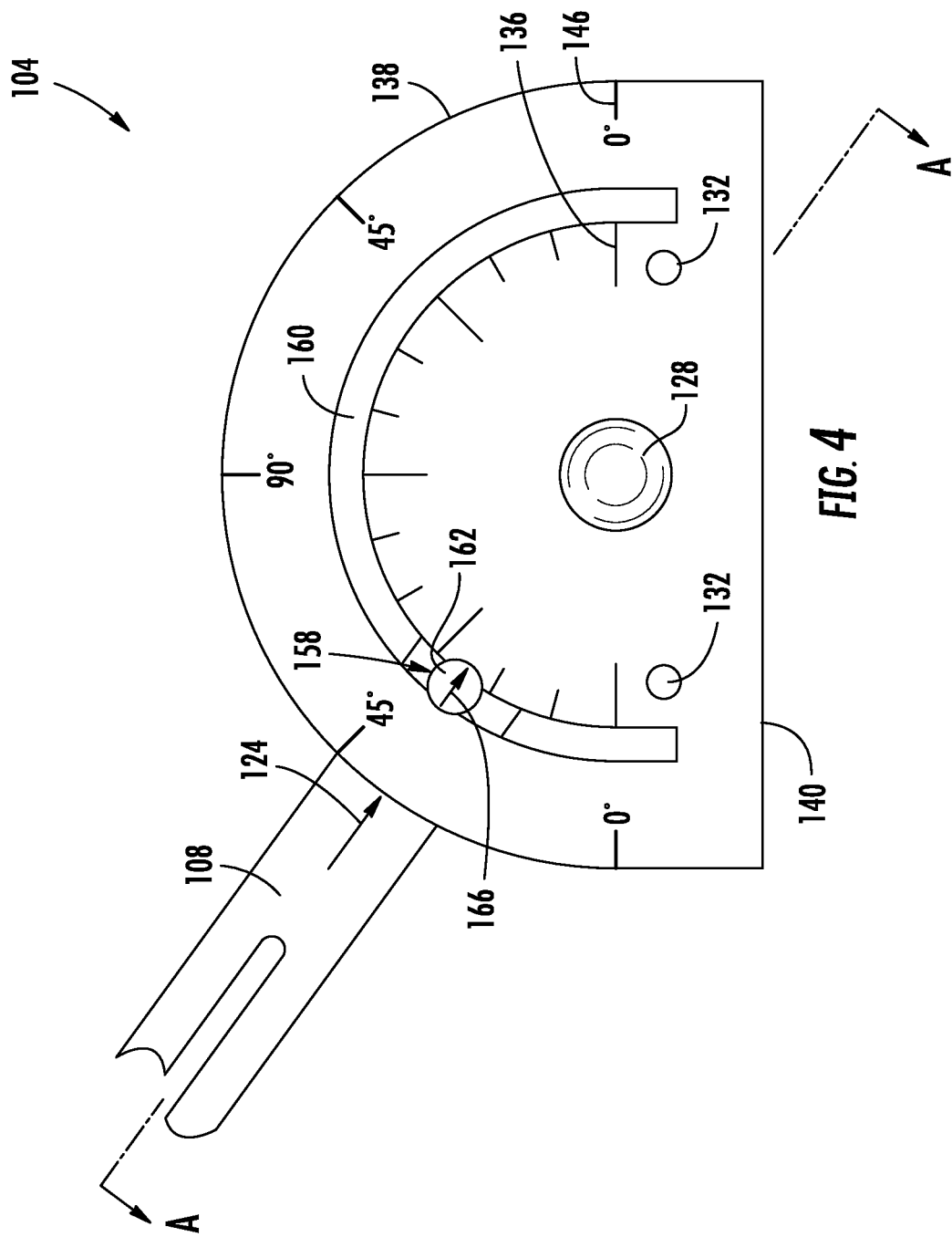
FIG. 4 is a front view of a protractor including secondary graduation markings and a secondary reference marking.

Referring now to FIG. 3, a first set of graduated reference lines or graduations 146 are radially disposed about the connection member 128 and are located proximate the first edge 138 and radiate inwards towards the connection member 128. The graduations 146 may represent degrees of incline, and may range from 0° up to 180°. In some embodiments, the first plate 126 may include one or more additional sets of secondary graduations 136 as shown in FIG. 4. In certain other embodiments, the protractor 104 may include one or more secondary reference markings 166, which tend to assist the user in acquiring a measured angle from the secondary graduations 136 quickly and easily.

Figure 5:
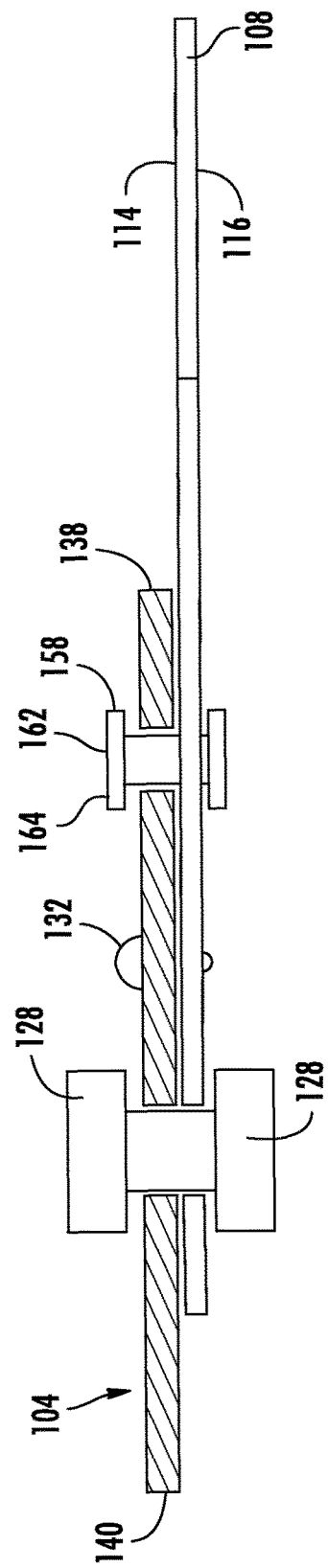
FIG. 5 is a side sectional view shown along line A-A in FIG. 4.

Referring now to FIGS. 4 and 5, the secondary reference markings 166 may be disposed on a retention member 158 and, in particular, on a top surface 162 thereof. The retention member 158 may comprise a post-like extension that extends perpendicularly from the first side 114 of the bar 108 and may include a flange 164 disposed about the top surface 162. The retention member 158 may be inserted into an arcuate slot 160 that is disposed about the center point of the arc formed by the first edge 138, and it may freely travel about that arc 160 as the first plate 126 is rotated with respect to the bar 108. In addition to providing the top surface 162 on which the secondary reference markings 166 may be printed, the retention member 158 may serve many additional utilitarian functions. For example, the flange 164 may assist in guiding the travel path of the bar 108 about the connection member 128 and also prevent the bar 108 from inadvertently becoming disconnected from the protractor 104.

In certain other embodiments, the retention member 158 may comprise a screw connection or a clamping connection that would tend to allow the user to restrict the movement of the bar 108 with respect to the protractor 104. The retention member 158 may be used in place of or in addition to the connection member 128 to restrict the rotational movement of the bar 108 with respect to the protractor 104.

Figure 7:
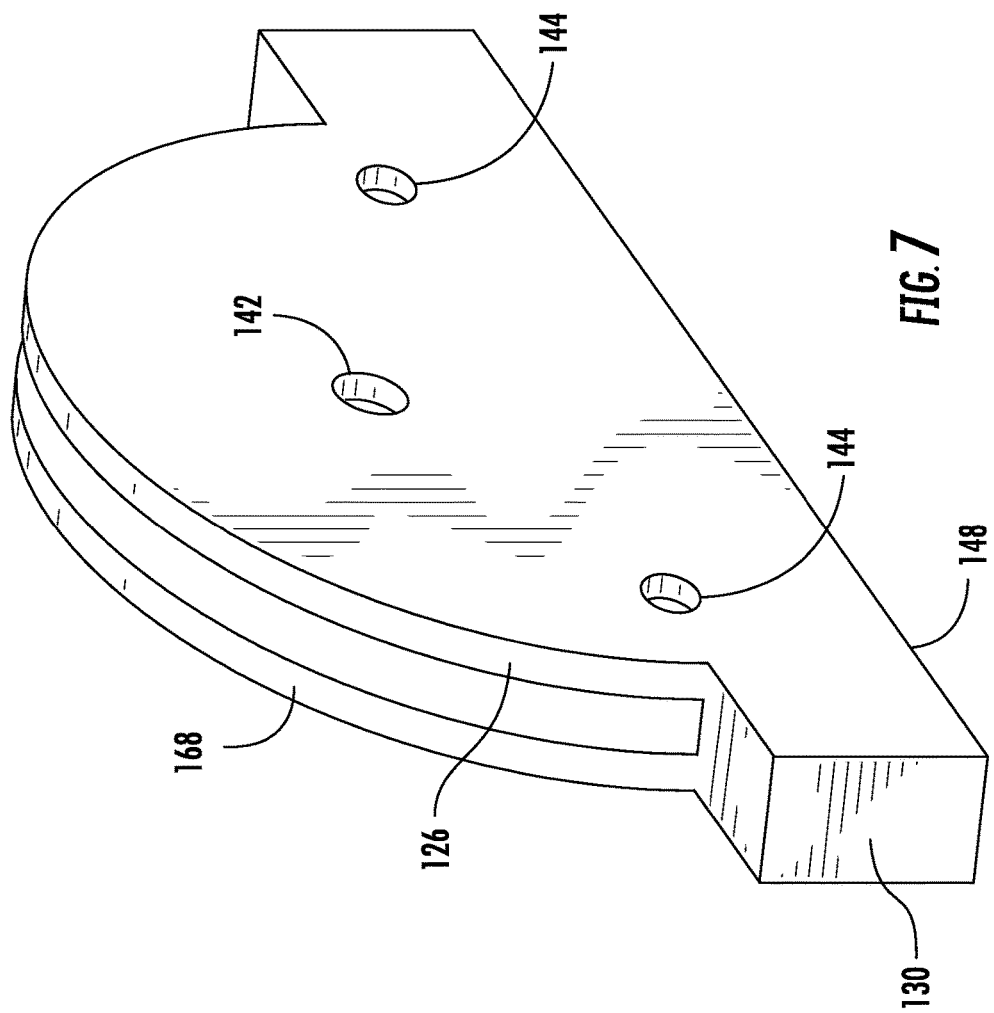
FIG. 7 is a perspective view of a contact member formed as a unitary member with the first plate and second plate.
Figure 19:
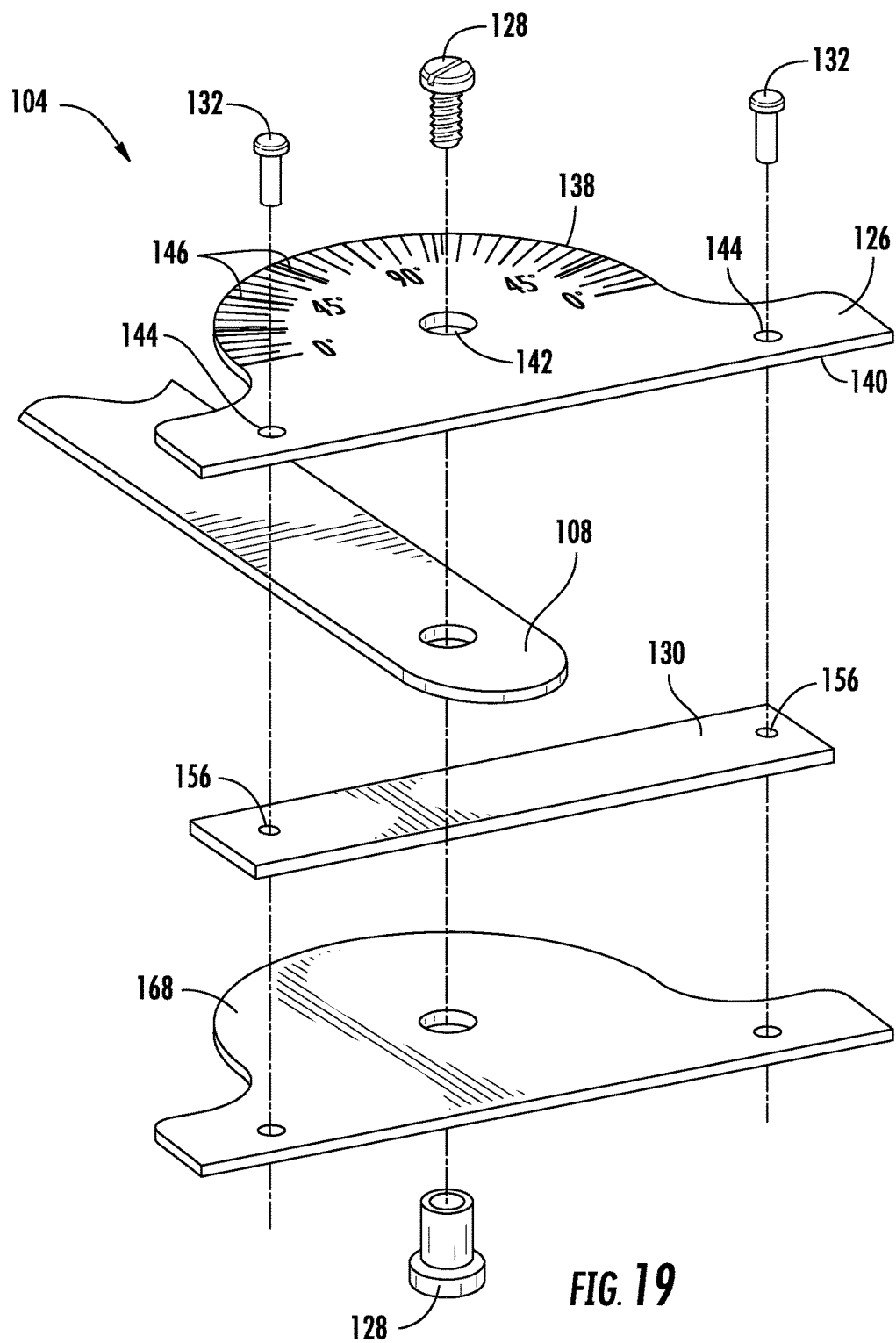
FIG. 19 is an exploded view of an alternate embodiment of a protractor having a first plate and a second plate.
Figure 20:
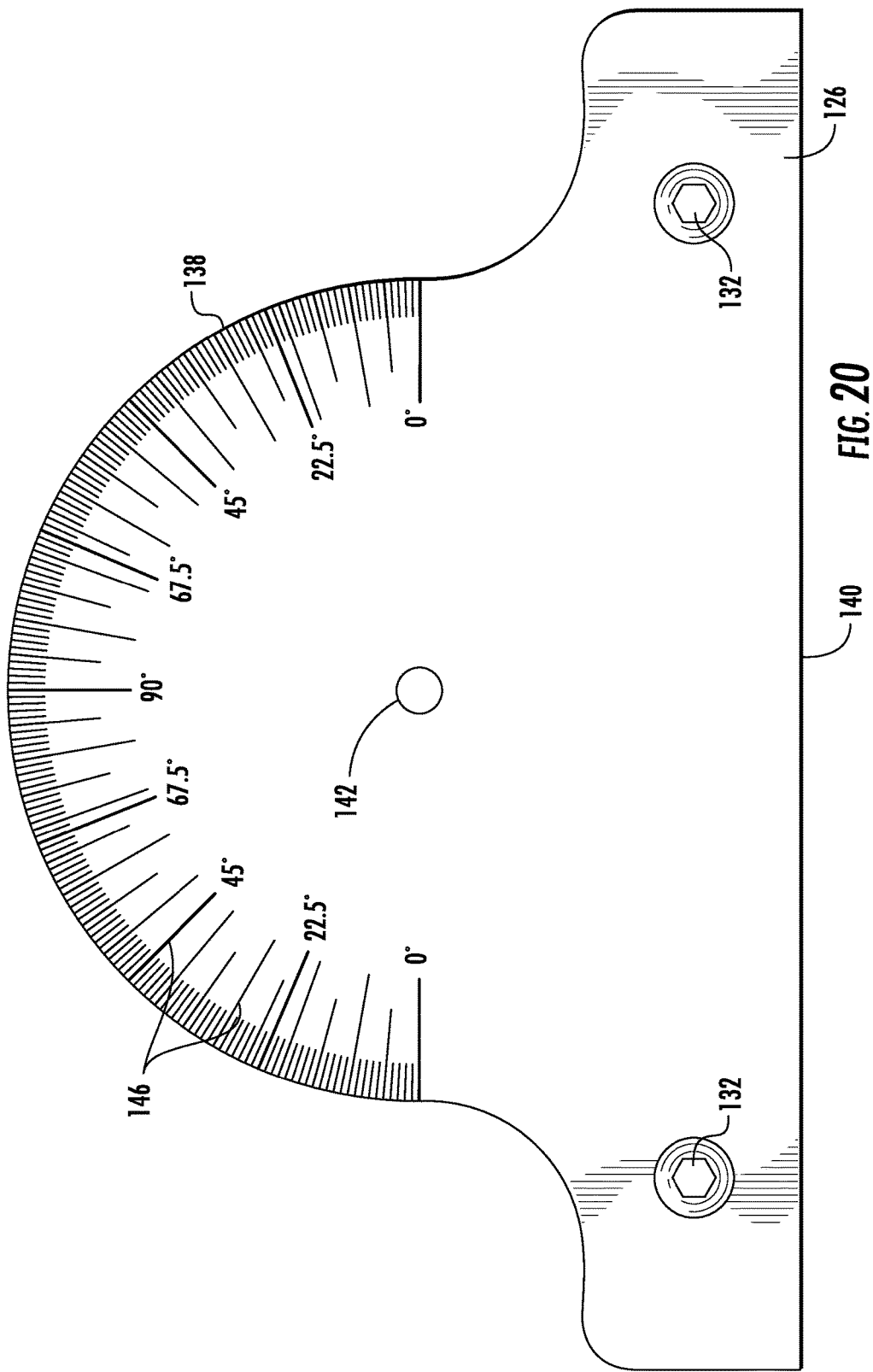
FIG. 20 is a front view of the first plate of FIG. 19.

Referring to FIGS. 1 and 2, in certain embodiments, the measuring tool 100 may further comprise a contact member 130 that includes a substantially planar first side 148 that may be used for contacting a point of interest (e.g., the outside of a length of pipe or a pipe connection) as an alternative to contacting the point of interest using the second edge 140 of the first plate 126. As shown in FIG. 2, the contact member 130 may also include a plurality of connection openings 156. In another embodiment, as shown in FIG. 6A, the contact member may further comprise at least one of a first ledge 150 or a second ledge 152, which are located on opposite sides of the contact member 130. As shown in FIG. 6B, the ledges 150, 152 are dimensioned to receive the first plate 126 and a second plate 168. In this way, the contact member and the plate 126, 168 form a flush external surface. In an alternative embodiment, shown in FIG. 7, the first plate 126, the contact member 130 and the second plate 168 may be formed as a single unitary piece. In this way, movement between these components is eliminated. FIGS. 19 and 20 depicts an alternative embodiment that includes plates 126, 168 wherein the first edge 138 includes shoulder portions. The contact member 130 may be positioned between the first plate 126 and the second plate 168 as a spacer. Ideally, the contact member 130 is of sufficient width such that the bar 108 travels freely between the plates 126, 168. For example, the thickness of the contact member 130 may be the same or greater than the thickness of the bar 108.

Figure 9:
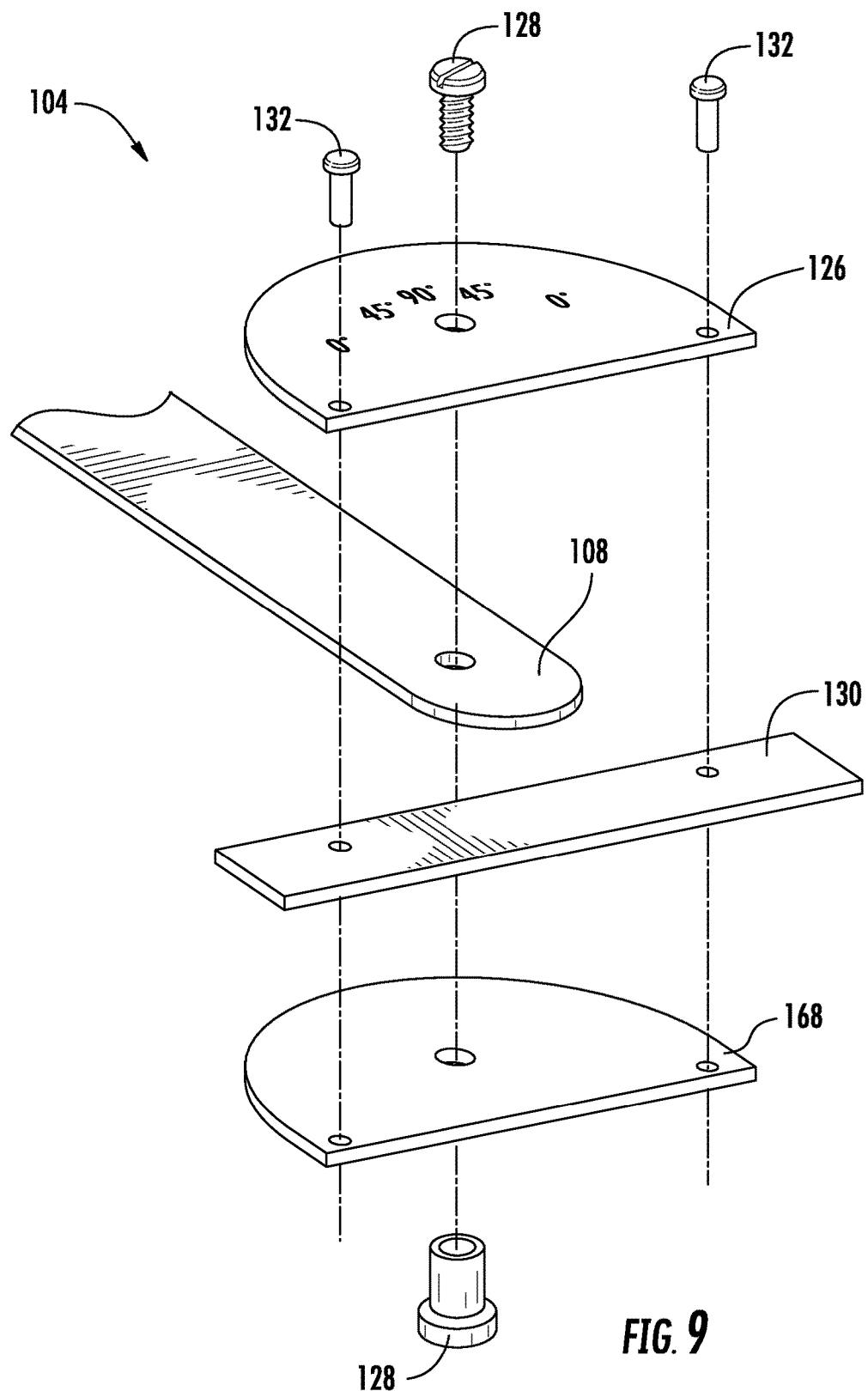
FIG. 9 is an exploded view of a protractor having a first plate and a second plate.

As shown in FIG. 9, the plates 126, 168 may be secured to the contact member 130 via a plurality of connectors 132. These connectors 132 may used to form a threaded connection, a bolted connection, a riveted connection, or other similar connection types that fixedly connect the first plate 126 to the contact member 130 such that movement between those components is minimized or eliminated altogether. Limiting movement or rotation of the contact member 130 will tend to reduce variability in the measuring procedure and will tend to produce more accurate and consistent measured values.

Figure 8:
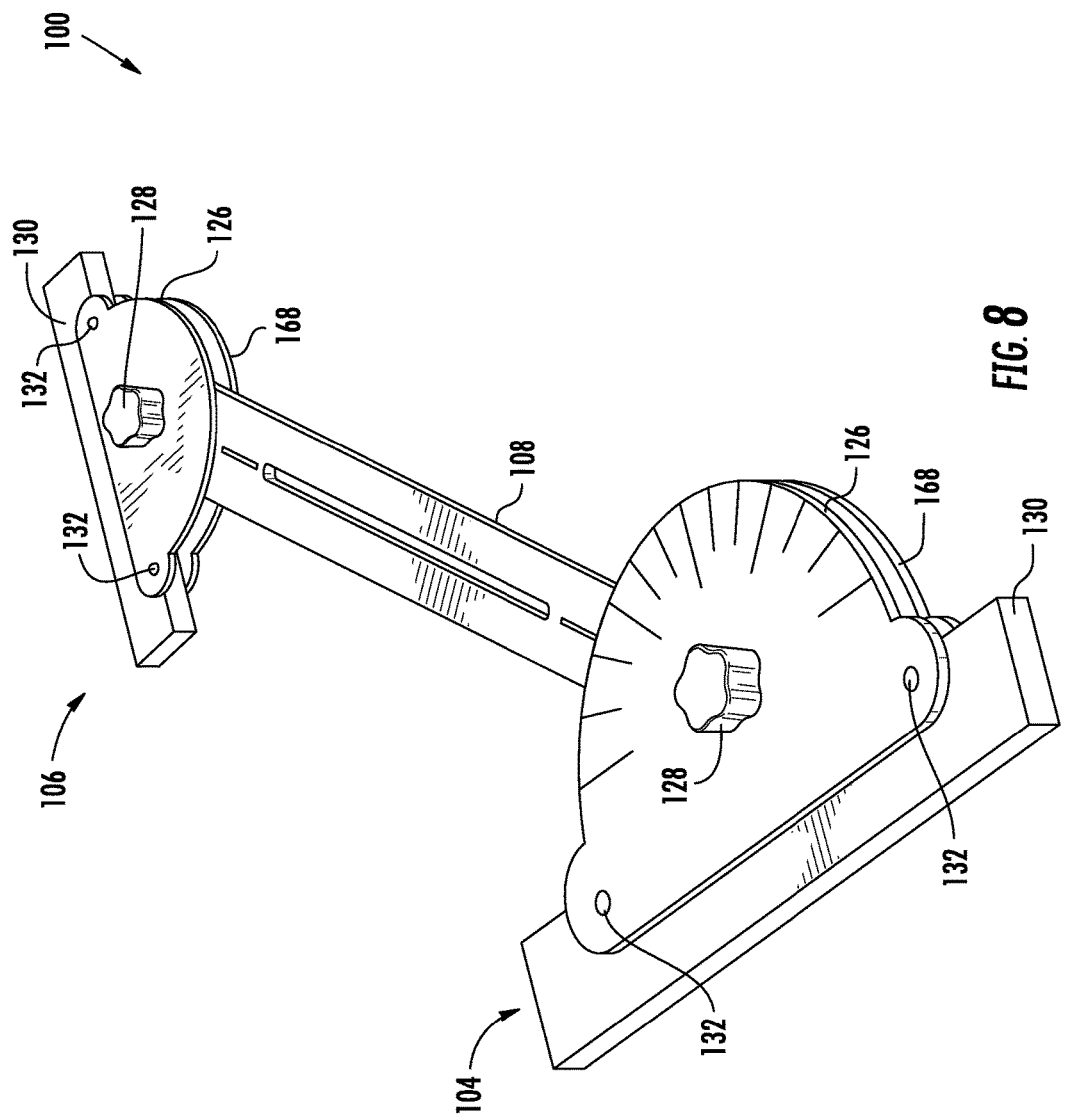
FIG. 8 is a perspective view of a measuring device with two protractors, each with a first plate and a second plate.
Figure 10:
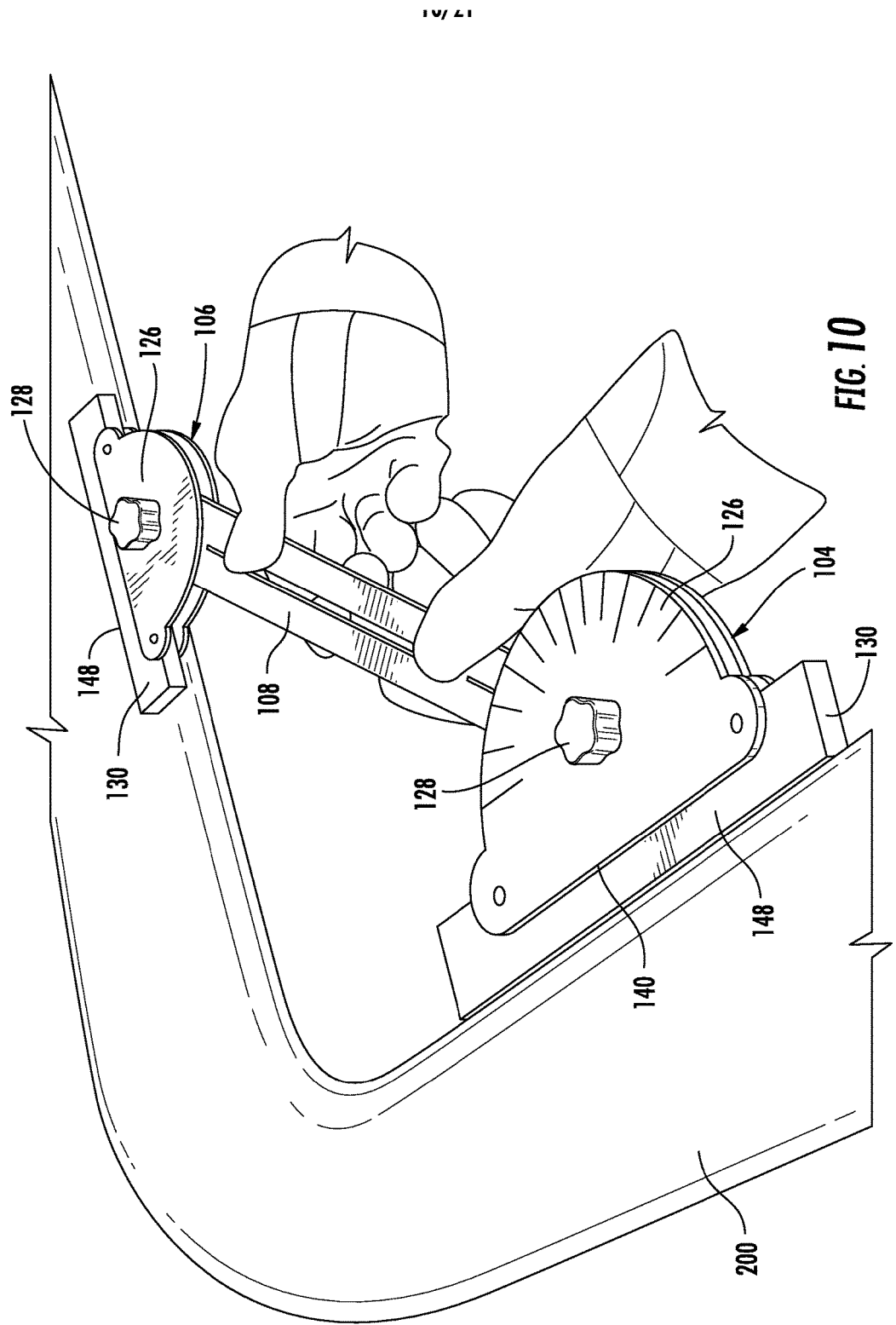
FIG. 10 depicts a person using the measuring device of FIG. 9 to fit a 90° fitting in a section of pipe.

As the first plate 126 is rotated with respect to the bar 108, the rotational movement is generally guided by the connection member 128 and the first plate 126. In some embodiments, as shown in FIGS. 8 and 9, the rotational movement may be further stabilized by the second plate 168. In some embodiments, the second plate 168 has an identical structure to the first plate 126, such that either the first plate 126 or the second plate 168 may used to take measurements at the points of interest. For example, a user may read the measurement from the first plate 126 when the point of interest is below eye level or from the second plate 168 when the point of interest is above eye level. FIG. 10 illustrates this particular embodiment being used to take measurements at two portions of a pipe 200. This embodiment is generally useful for smaller pipes and distances or where space is particularly limited. However, as further described below, other embodiments of the measuring tool 100 are well suited for larger distances or where space is not particularly limited.

Figure 11:
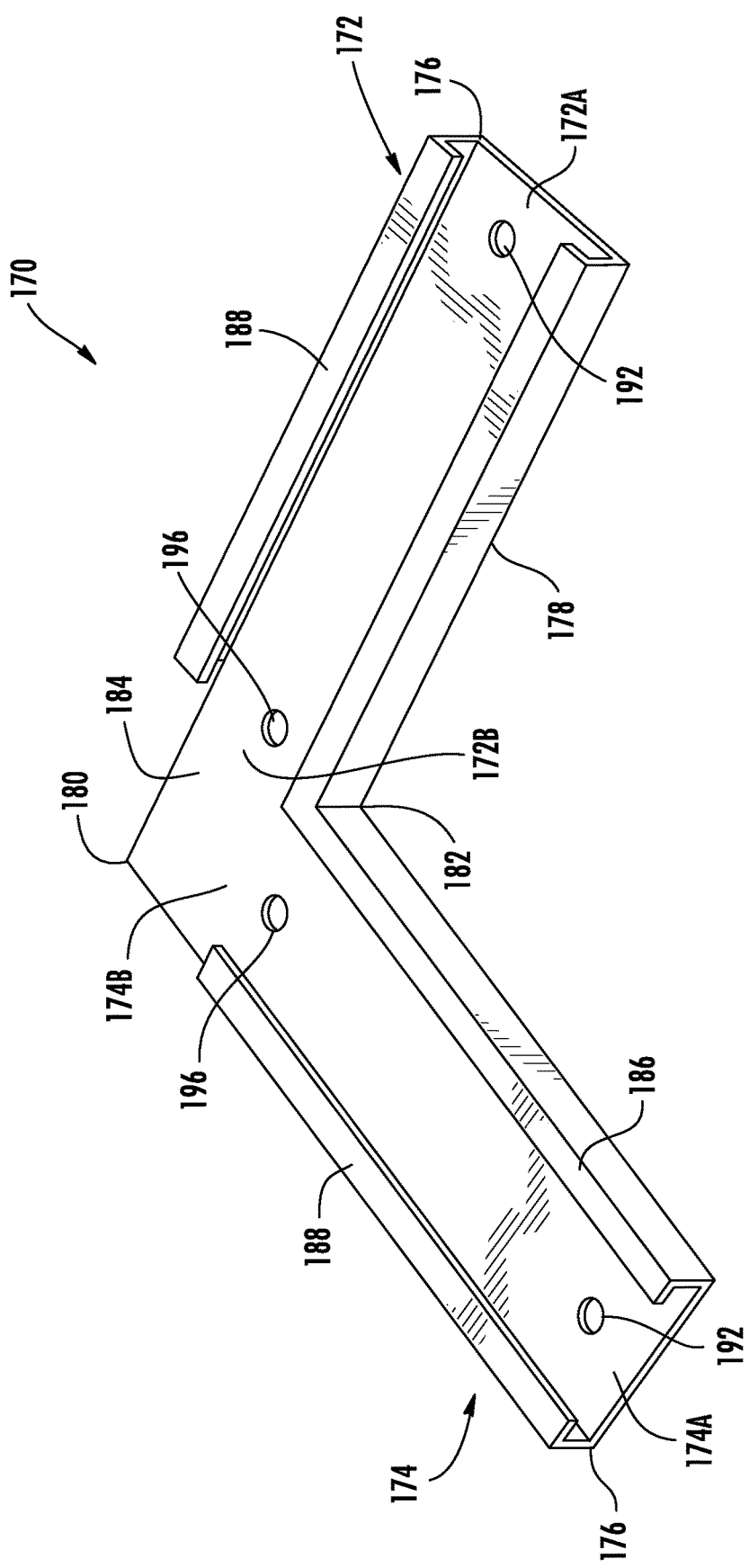
FIG. 11 is a perspective view of a guide.
Figure 21:
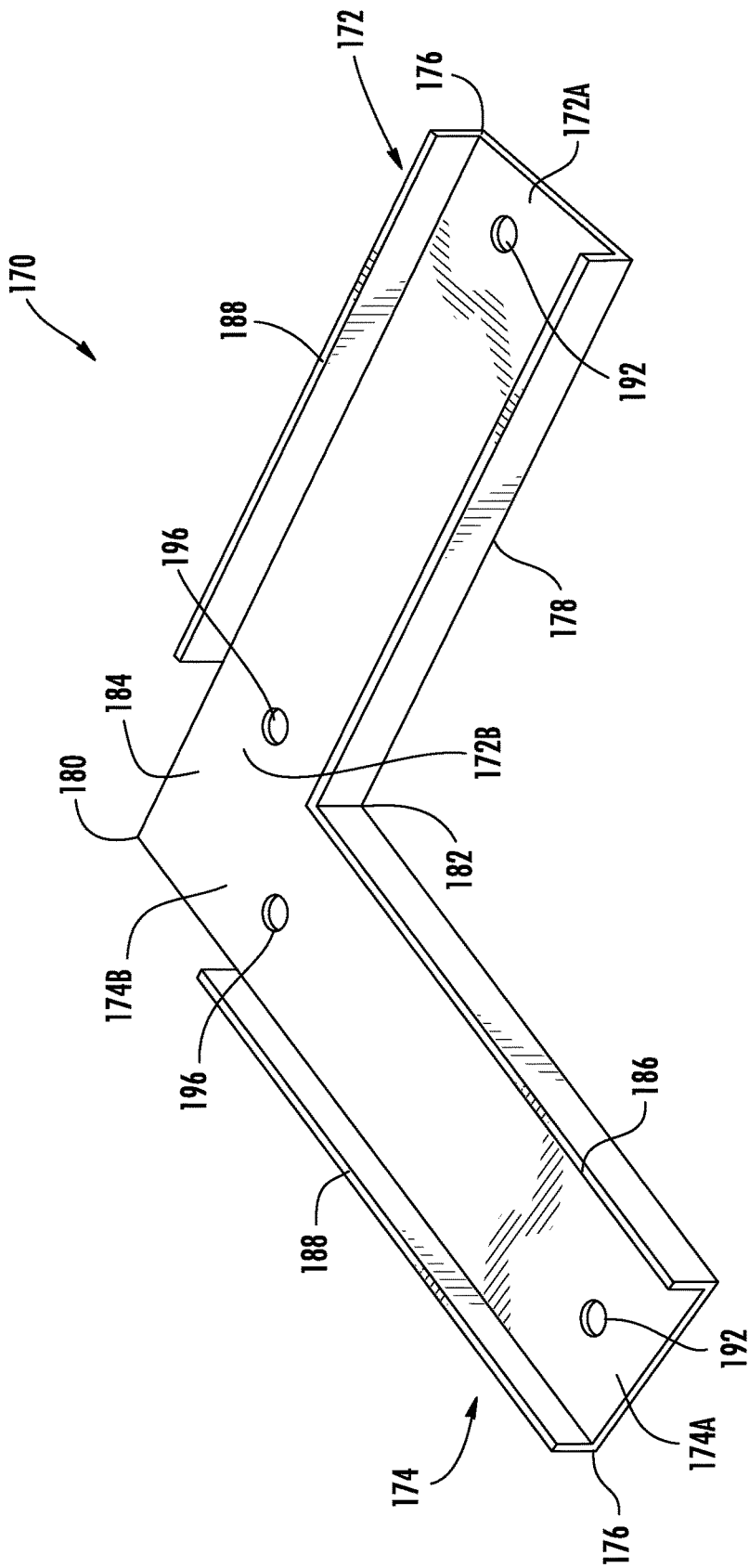
FIG. 21 is a perspective view of an alternate embodiment of a guide.

Referring now to FIG. 11, a guide 170 is provided. In certain embodiments, the guide 170 may be L-shaped, having an elongate first leg 172 and an elongate second leg 174, including an outer edge 176 and an inner edge 178, which intersect each other at an outside heel 180 and an inside heel 182, respectively. Additionally, the first leg 172 includes a proximate end 172A and a distal end 172B, and the second leg 174 includes a proximate end 174A and a distal end 174B. In certain other embodiments, the intersection formed by the first leg 172 and the second leg 174 at the inside heel 182 forms a 90° angle. Formed along at least a portion of the inner edge 178 and extending perpendicularly away from an upper surface 184 of the guide 170, is an inner rail 186. Similarly, formed along at least a portion of each of the outer edges 176 and extending perpendicularly away from the upper surface 184 of the guide 170, is an outer rail 188. In some embodiments, the rails 186, 188 may include a lip as shown in FIG. 11. However, in certain other embodiments, as shown in FIG. 21, no lip is present and the bar 108 may positioned directly onto the guide 170.

Figure 12:
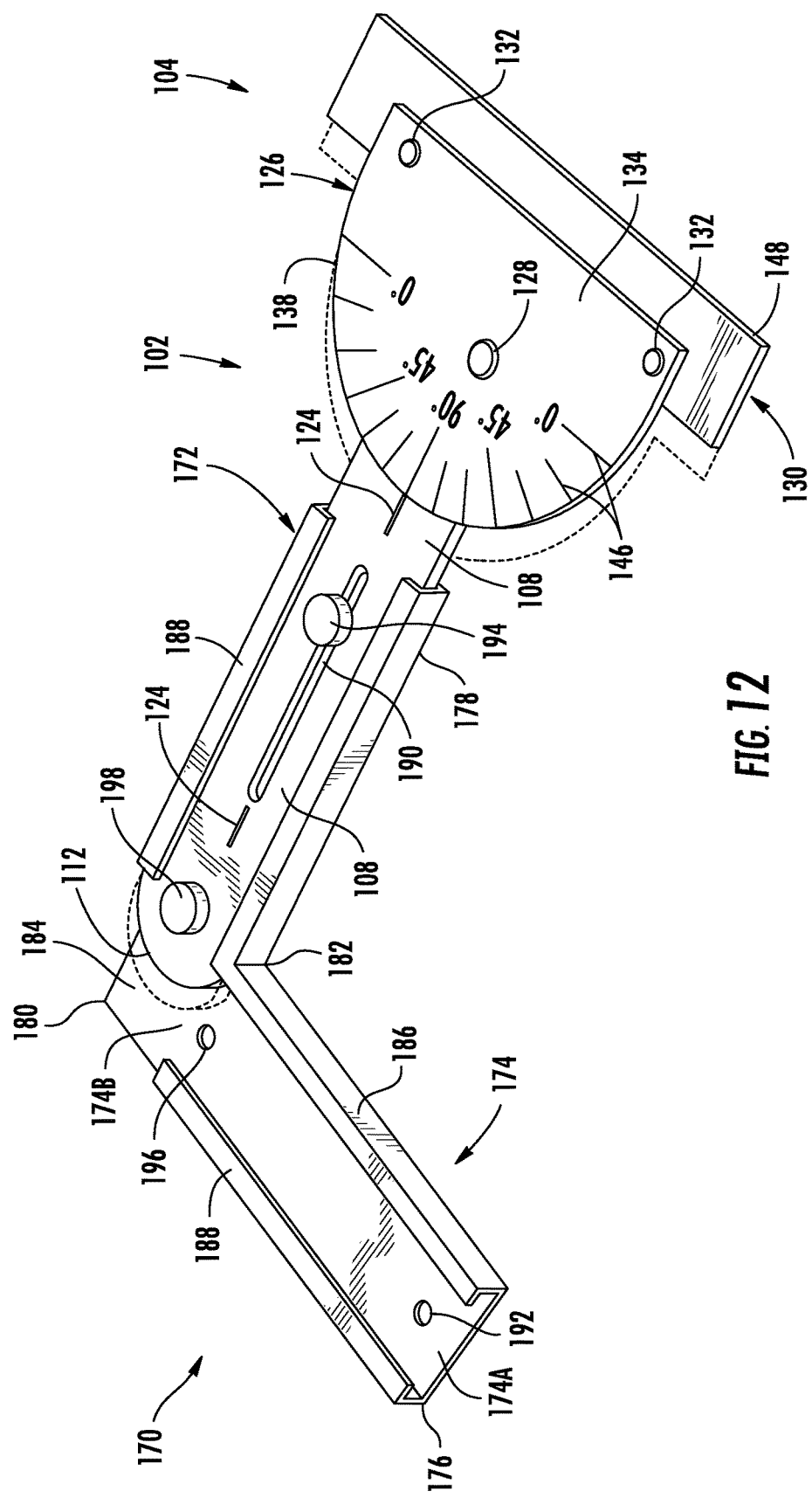
FIG. 12 is a perspective view depicting a measuring apparatus including a protractor and a bar connected with a guide.

The guide 170 may further include three connection points, one connection point on each proximal end 172A and 174A and a third connection point at the distal end 172B, 174B. As shown in FIG. 12, the guide 170 is designed to work cooperatively with at least one arm 102 and at least one of the protractors 104, 106. The connection points are formed by the inner rails 186 and outer rails 188, which are dimensioned to received at least a portion of the bar 108 of the arm 102. In particular, the first end 110 or the second end 112 of the bar 108 may be slidably inserted into the guide 170 between the rails 186, 188. The rails 186, 188 are dimensioned such that the bar 108 is held securely against the upper surface 184 of the bar 108 and such that the bar 108 may slide along the length of the guide 170 within the rails 186, 188. In some embodiments, more than one bar 108 may be inserted into the guide 170. The movement of the bar 108 is shown in phantom lines in FIG. 12. The bar 108 may be inserted into either the proximal end 172A, 174A or the distal end 172B, 174B of either leg 172, 174 of the guide 170.

As previously mentioned, in certain embodiments, the arm 102 may further include an extension section. The extension section may comprise an elongate channel 190 that runs at least a portion of the length of the bar 108 between the first end 110 and the second end 112 and may be oriented along the central axis 122. The guide 170 may further include a first guide bore 192 along the first arm 172 or second arm 174 that is dimensioned to work cooperatively with the elongate channel 190 to receive a second connection member 194. The second connection member 194 may be inserted through the elongate channel 190 and then through the first guide bore 192. Once positioned, the second connection member 194 tends to guide the movement of the bar 108 as it is repositioned along the first leg 172 or second leg 174 of the guide 170. The second connection member 194 may comprise a threaded connection, a bolt, a pin, a rivet, or other similar connection means that allows translation of the bar. In certain embodiments, the second connection member 194 may be selectively tightened to prevent or arrest the translational movement of the bar 108 with respect to the guide 170. In that way, the distance between the protractors 104 and 106 and the guide 170 may be selectively extended or reduced, and, once in the desired location, locked into place.

In certain other embodiments, at least one of the legs 172, 174 of the guide 170 may further include a second guide bore 196. The second guide bore 196 is dimensioned to work cooperatively with either the first connection opening 118 or second connection opening 120 (both shown in FIG. 2) to receive a third connection member 198. The third connection member 198 may be selectively inserted through the first connection opening 118 or second connection opening 120 and then through the second guide bore 196 to fixedly attach the bar 108 to the guide 170. The third connection member 198 may include a threaded connection, a bolt, a pin, a rivet, or other similar connection means. One benefit of this configuration is that the measuring tool 100, including all of its components, may be secured together and stored when not in use. This configuration may be used to secure the components of the measuring tool 100 when it is not in use. In an alternative configuration, as shown best in FIG. 17, the third connection member 198 may be inserted through the elongate channel 190 of a second bar 108 such that the bar 108 may slide along the length of the guide 170 within the rails 186, 188.

Figure 13:
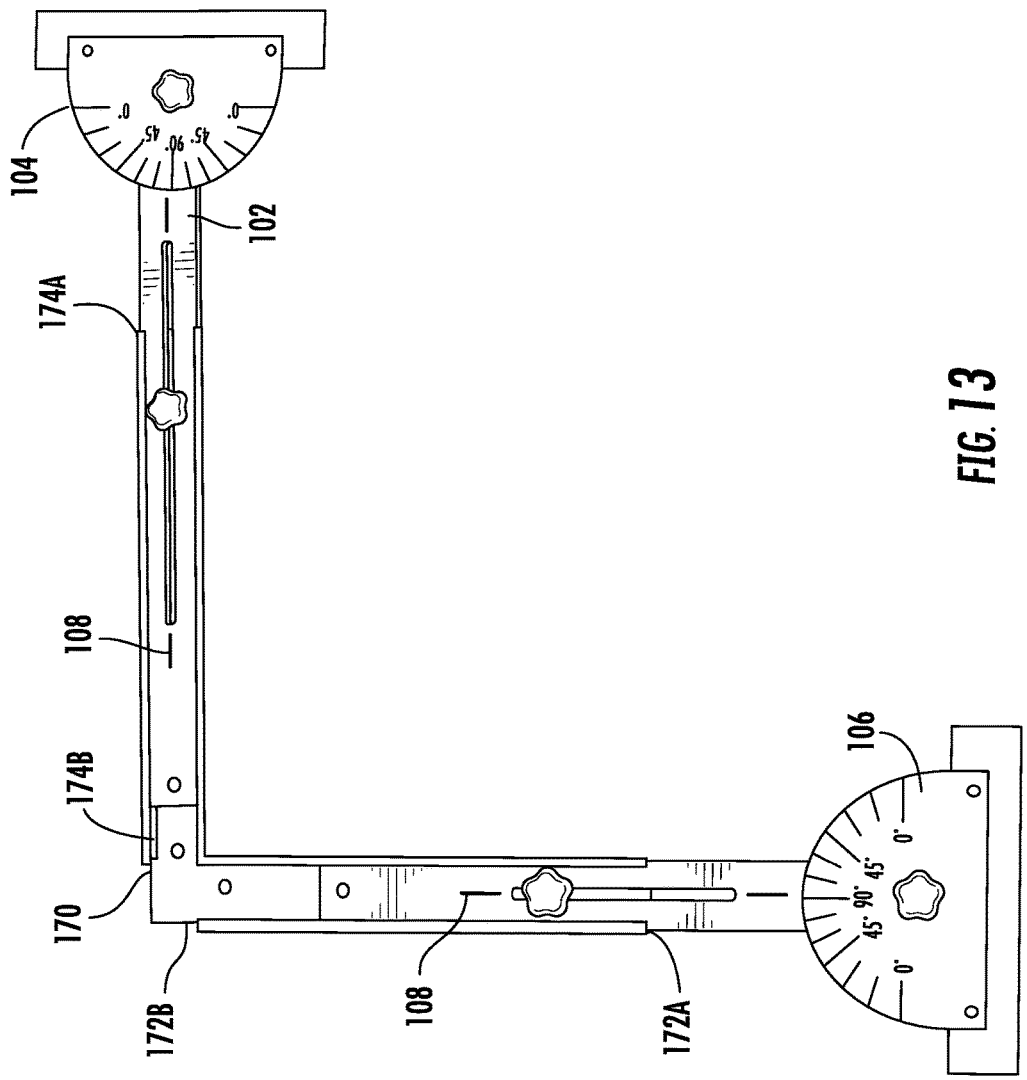
FIG. 13 is a front view depicting a measuring apparatus including a pair of protractors and bars connected with a guide.
Figure 14:
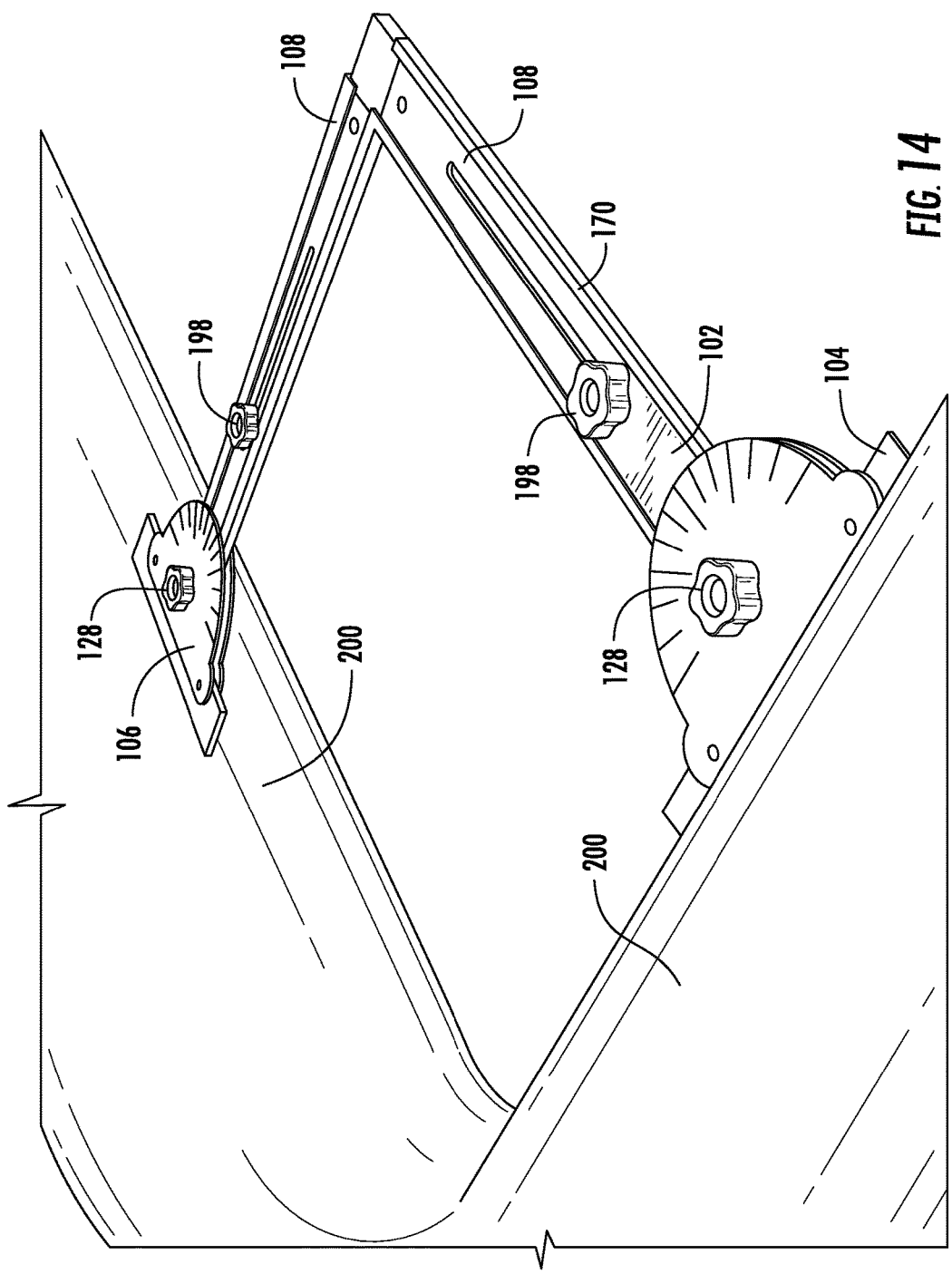
FIG. 14 depicts a measuring apparatus positioned along the inside of a 90° turn in a section of pipe.
Figure 15:
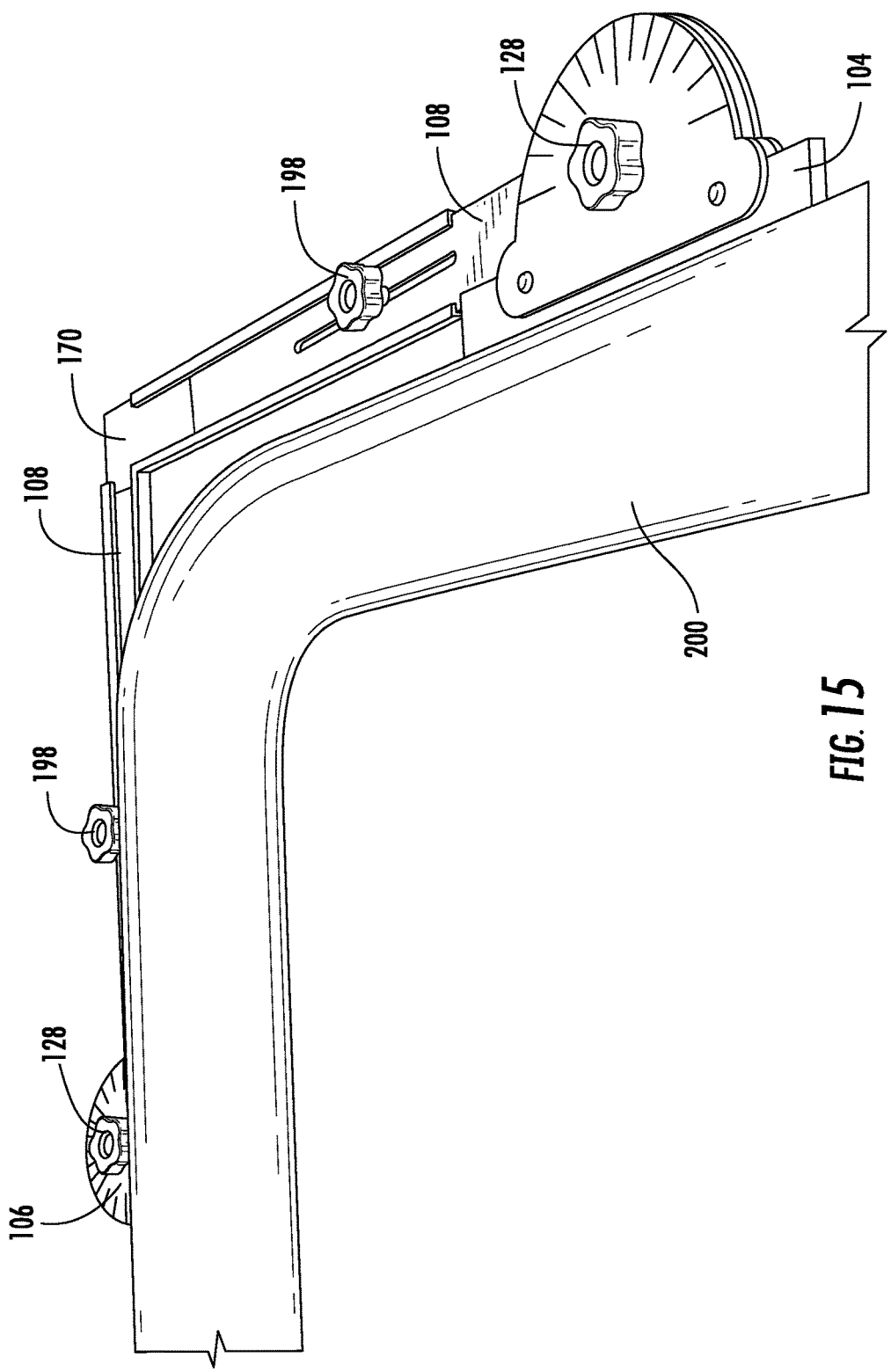
FIG. 15 depicts a measuring apparatus positioned along the outside of a 90° turn in a section of pipe.
Figure 16:
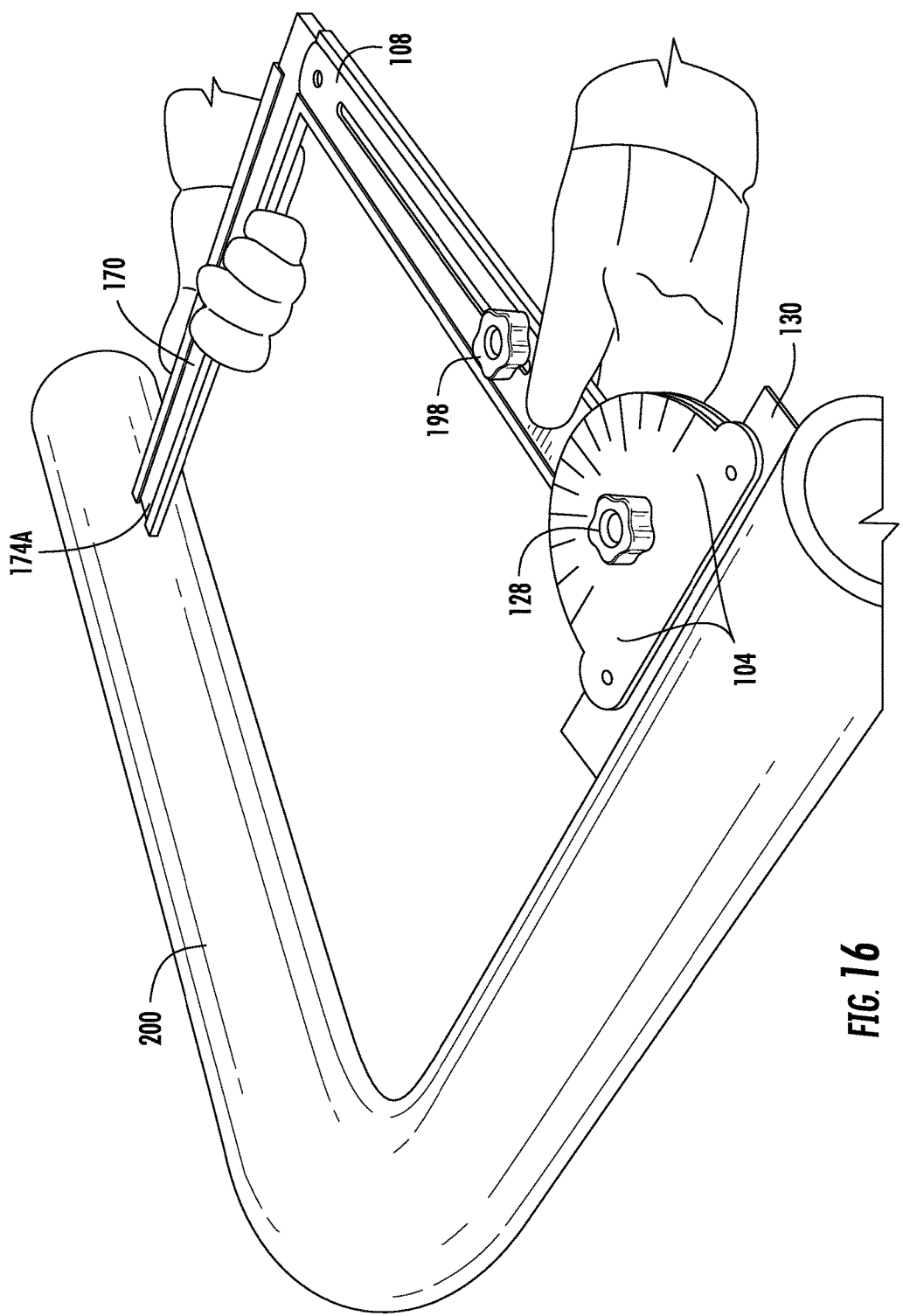
FIG. 16 depicts a person using a measuring device including a single protractor along the inside of a 90° turn in a section of pipe.

In certain embodiments, as shown in FIG. 13, each of the protractors 104, 106 may be connected to one end of an arm 102 and then inserted into the proximate ends 172A, 174A of the guide 170. As shown in FIGS. 14 and 15, this particular configuration is well suited for large distances and also for taking measurements along the inside of a turn (FIG. 14) or for taking measurements along the outside of a turn (FIG. 15). FIG. 16 demonstrates the use of the guide 170 and only a single protractor 104. In this embodiment, a portion of the protractor 104 is shown contacting a first point of interest and a proximate end 174A of the guide 170 is shown contacting a second point of interest.

Figure 17:
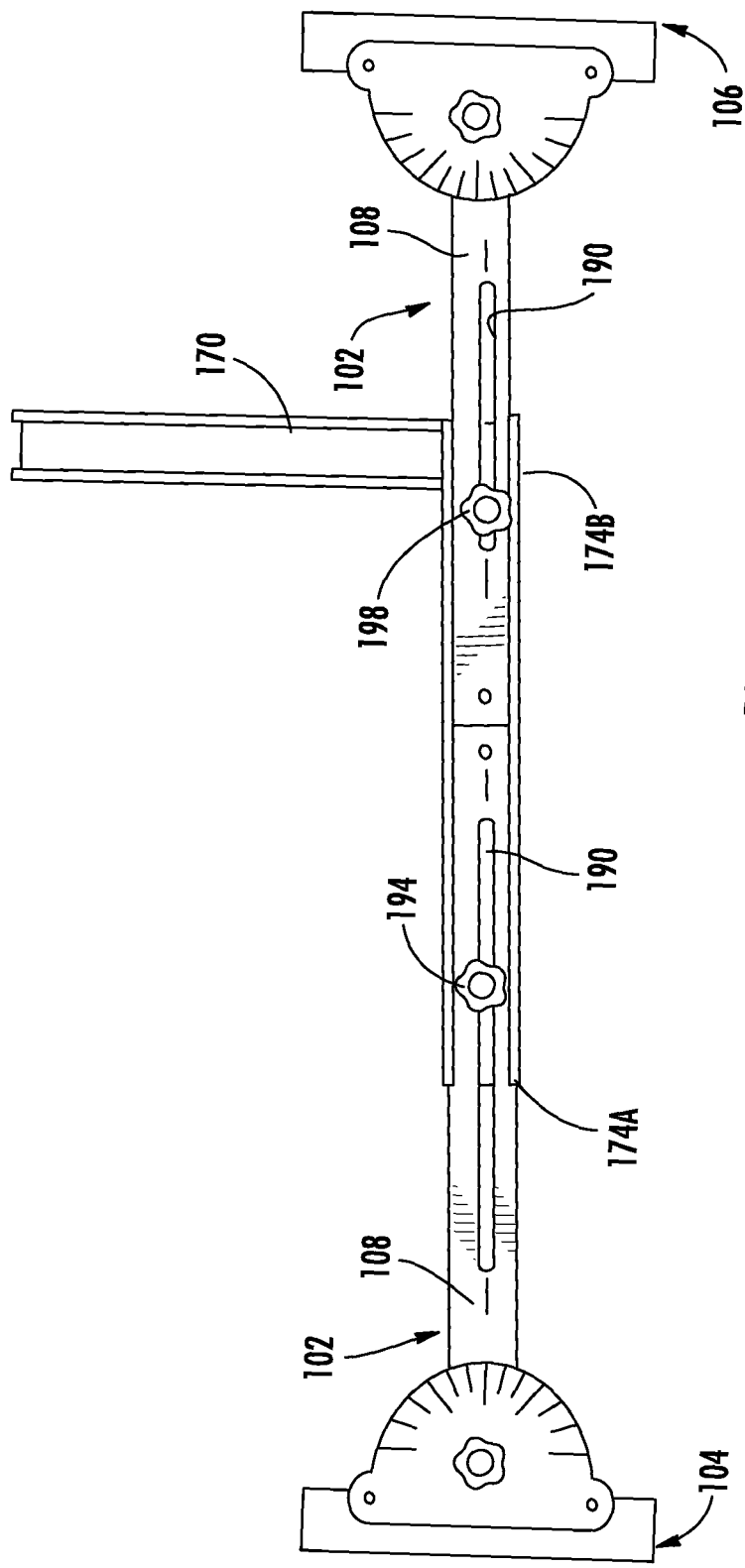
FIG. 17 is a front view of an alternative configuration of a measuring apparatus including a pair of protractors and bars connected with a guide.
Figure 18:
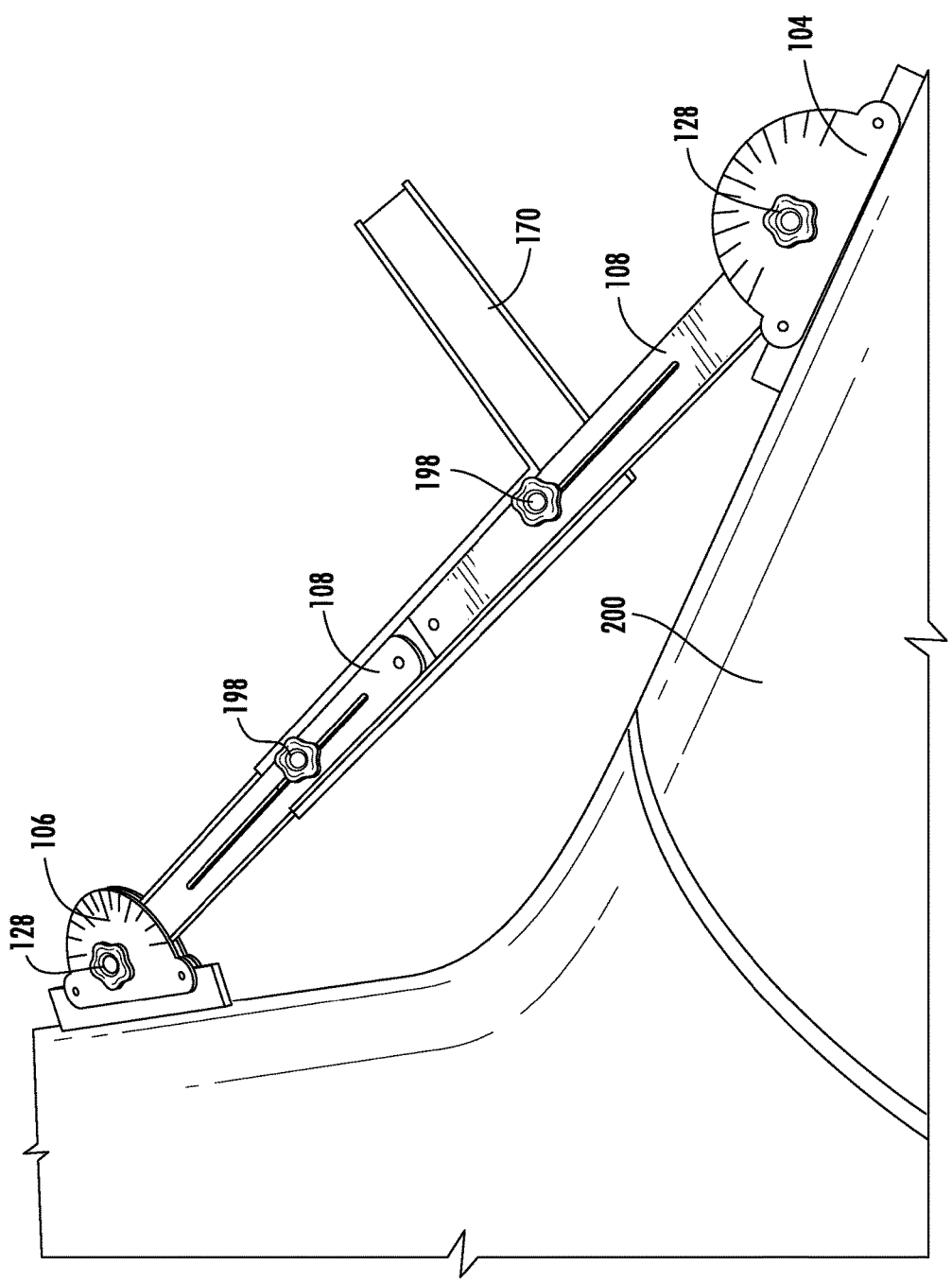
FIG. 18 depicts the measuring apparatus of FIG. 17 positioned along the inside of a 45° turn in a section of pipe.

Other embodiments are well suited for very long distances. As shown in FIGS. 17 and 18, the measuring tool 100 may be reconfigured such that the protractors 104, 106 are oriented at 180° to one another. In this embodiment, the first protractor 104 may be inserted into the proximate end 174A of the second leg 174 and the second protractor has been inserted into the distal end 174B of the second leg 174. It should also be noted that, in this configuration, the second connection member 194 has been inserted into the elongate channel 190 of the bar 108 and then attached to the guide 170 at the first guide bore 192 (FIG. 9). Additionally, the third connection member 198 has been inserted into the elongate channel 190 of the bar 108 and then attached to the guide 170 at the second guide bore 196 (FIG. 11). In this way, the movement of both arms 102 is controlled and may be selectively arrested.

In operation, the measuring tool 100 is positioned against the two points of interest. The protractors 104, 106 may be used to measure angles at that point of interest. Generally, the measured angle is measured between the arm 102 and the second edge 140. One method for quickly determining the total angular offset at a particular location involves simply adding together the angle measured at each protractor. For example, referring to FIG. 14, by ensuring that the sum of the angles measured of the two protractors 104, 106 equals 90°, a user can quickly ensure a 90° turn. In some embodiments, as shown in FIG. 20, graduations 146 may be provided to simply to simplify measuring angles other than 90°. For example, if both protractors 104, 106 are set to the 22.5° graduation, a 45° turn is obtained.

The foregoing description of embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A measuring tool for determining angles at two points of interest, the measuring tool consisting essentially of:
   a one piece, non-extendable elongate arm having a first end and a second end;
   and
   a first protractor rotatably mounted at the first end and a second protractor rotatably mounted at the second end, each protractor comprising:
   a first edge comprising an arc, and a first set of graduations for providing an angular measurement in degrees of incline between the protractor and the elongate arm; and
   a second edge comprising a flat, for positioning the protractor against one of the two points of interest;
   whereby the angle at each point of interest is the angular measurement between the elongate arm and each flat, respectively.

2. The measuring tool of claim 1, wherein the elongate arm further comprises a reference marking for aligning with the first set of graduations.

3. The measuring tool of claim 1, wherein the elongate arm further comprises an extension section, such that a distance along the elongate arm between the two protractors can be selectively extended and reduced.

4. The measuring tool of claim 1, wherein each protractor further comprises an arcuate slot and the arm further comprises a post extending through the arcuate slot, the arcuate slot in combination with the post for guiding the rotation of the protractor with respect to the arm.

5. The measuring tool of claim 1, wherein the protractors each further comprise two plates, one of each of the plates rotatably mounted on either side of the elongate arm.

6. The measuring tool of claim 1, wherein the protractors each further comprise two plates, one of each of the plates rotatably mounted on either side of the elongate arm, with the second edge fixedly mounted between the two plates.

7. The measuring tool of claim 1, wherein the protractors each further comprise a lock for locking the protractor in a desired angular position with respect to the elongate arm.

8. A measuring tool for determining angles at two points of interest, the measuring tool comprising:
   an elongate arm having a first end and a second end; and
   a first protractor rotatably mounted at the first end and a second protractor rotatably mounted at the second end, each protractor comprising:
   a first edge comprising an arc, and a first set of graduations for providing an angular measurement in degrees of incline between the protractor and the elongate arm;
   a second edge; and
   a contact member mounted to the first protractor proximate the second edge and having a flat for positioning the protractor against one of the two points of interest;
   whereby the angle at each point of interest is the angular measurement between the elongate arm and each flat, respectively.

* * * * *